Feb. 12, 1963   R. L. DAUGHERTY   3,077,542
LOAD CONTROL DEVICE
Filed June 8, 1959   4 Sheets-Sheet 1

INVENTOR.
ROBERT L. DAUGHERTY
BY Mason, Kolehmainen,
Rathburn and Wyss.
ATTORNEYS Feb. 12, 1963  R. L. DAUGHERTY  3,077,542
LOAD CONTROL DEVICE
Filed June 8, 1959  4 Sheets-Sheet 2

INVENTOR.
ROBERT L. DAUGHERTY
BY Mason, Kolehmainen
Rathburn and Wyss.
ATTORNEYS.

3,077,542
LOAD CONTROL DEVICE
Robert L. Daugherty, Reedsburg, Wis., assignor to Robertshaw-Fulton Controls Company, Richmond, Va., a corporation of Delaware
Filed June 8, 1959, Ser. No. 818,728
9 Claims. (Cl. 307—34)

The present invention relates generally to load control devices and, more particularly, to devices for controlling the magnitude of the total electrical load of a domestic or commercial installation.

Although the load control device of the present invention is well suited for use in controlling the total load of an installation employing both electrical heating elements as employed, for example, in space or central heating plants, and conventional household electrical elements, for example, as hot water heaters, stoves, ovens, electrical appliances, lighting fixtures, and the like, the present invention should not be construed as being limited or restricted to this particular application, since it has a wide variety of applications with other types of electrical apparatus.

It is an object of the present invention to provide a load control device for reducing the total load of an electrical installation or system in response to the occurrence of an overload condition in a portion of the system.

It is another object of the present invention to provide a new and improved load control device which maintains the total load of an electrical system below a predetermined peak load value.

It is still another object of the present invention to provide a new and improved load control device for reducing the total load of an electrical installation during selected periods of time of each day.

It is still another object of the present invention to provide a load control device wherein the magnitude of the line voltage supplied to different loads is reduced in response to an overload condition.

It is yet a further object of the present invention to provide a load control device operative in response to an overload condition to render ineffective selected ones of the loads of an electrical system for a predetermined period of time.

It is a further object of the present invention to provide a load control device adapted to reduce an electrically resistive heating load in response to an overload condition in an electrical household load circuit, thereby preventing high total peak loads.

It is yet another object of the present invention to provide in a load control device a new and improved transfer switch which is responsive to an overload condition to reduce the total load of an electrical installation.

It is still a further object of the present invention to provide in a load control device a new and improved transfer switch embodying electromagnetic means which are deenergized when the switch is in its operative positions.

The invention has for another object the provision of a split bus arrangement for equalizing the load distribution of a single-phase, three-wire system when the circuit connected to the system is overloaded.

The above and other objects are achieved in accordance with the present invention by providing a new and improved load control device adapted to control the total load of an electrical installation in a residential or commercial system. In one embodiment of the present invention, the magnitude of the line voltage supplied from a single-phase, three-wire supply to electrical loads in a first part of the electrical installation is automatically reduced upon the occurrence of an overload condition in a second part of the installation. To this end, a detecting means associated with the second part of the installation determines the existence of a current in excess of a predetermined value and, in response to such current, operates a transfer switch which decreases the amount of voltage supplied to the first part of the installation. After the current in the second part of the installation falls below the predetermined value, the detecting means automatically operates the switch to apply the full line voltage to the loads in the first part of the installation. A split bus arrangement is employed to provide for distribution of the loads, thereby minimizing the possibility of overload in any one phase.

In another embodiment of the present invention, selected ones of the loads in the first part of the installation are sequentially rendered ineffective under the control of a timer apparatus for a predetermined period of time in response to an overload condition in the second part of the installation. A detecting means is associated with the second part of the installation but, instead of controlling a transfer switch, the latter detecting means controls the timer apparatus which operates sequentially to render ineffective selected ones of the loads in the first part of the installation, thereby to reduce the total load in the first part of the installation to a fraction of the normal load without rendering all of the loads completely inoperative during the period of operation of the timer apparatus. If at the end of the period of operation of the timer apparatus the overload condition in the second part of the installation has subsided, all of the loads in the first part of the installation are again rendered effective.

In each of the described embodiments, provision is made for operating the transfer switch and the timer apparatus, respectively, independently of the detecting means during certain periods of time during each day. Thus, the consumer may limit his power consumption during there periods, i.e., peak load hours, in order to take advantage of lower rates which are offered in many areas for off peak power.

As indicated above, in the first embodiment of the present invention, a new and improved transfer switch is utilized to change the magnitude of the voltage supplied to the loads in the first part of the installation. The switch is of the over-center type and employs suitable electromagnetic means which are momentarily energized to move the switch between its operative positions, the electromagnetic means being deenergized when the switch is in its operative position. The switch is further characterized by having pairs of its contacts biased together, independently of other pairs of contacts, to assure good electrical conduction between the switch contacts.

The invention, both as to its organization and manner of operation, together with further objects and advantages, will be best understood by reference to the following detailed description considered in conjunction with the accompanying drawings wherein.

Figure 8:
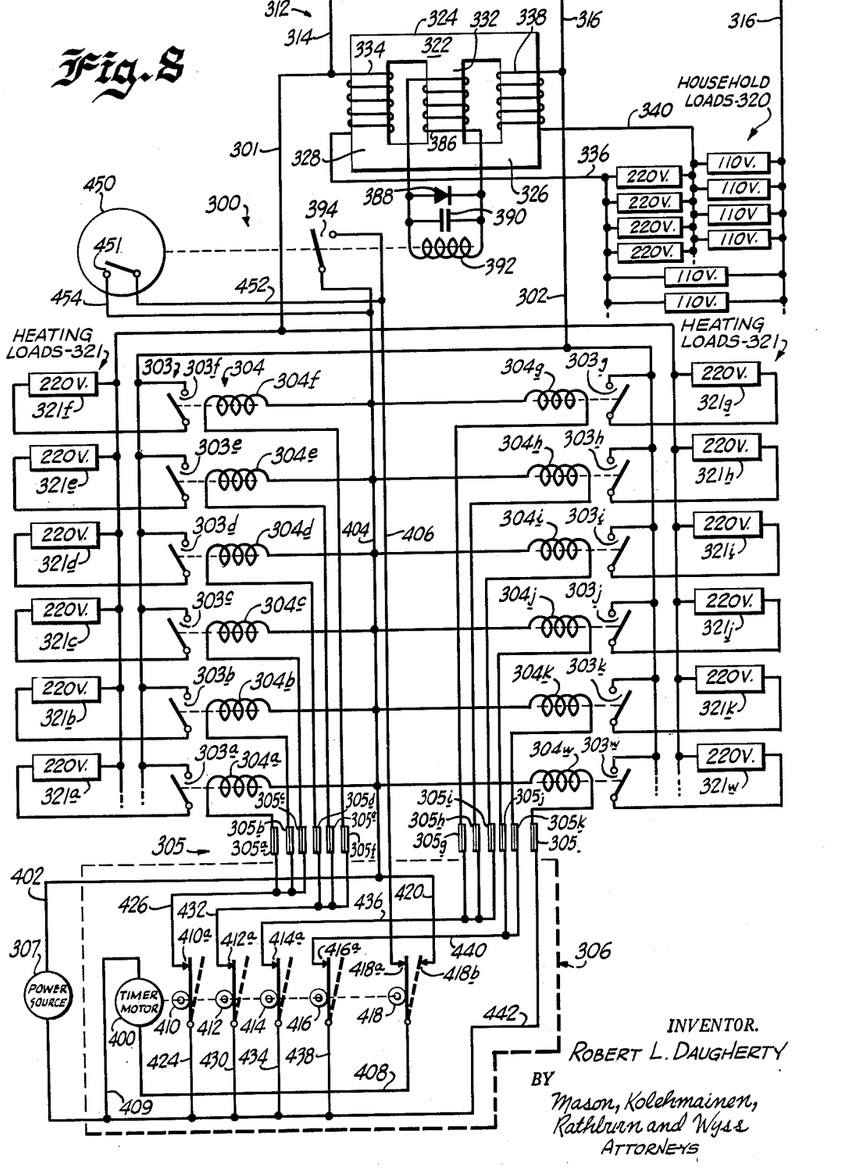
FIG. 8 is a schematic view of another embodiment of the load control device of FIG. 1.

Referring now to the drawings, there is illustrated a load control device for regulating the load in an electrical system. A first embodiment of the load control device is illustrated in FIGS. 1 through 7 while a second embodiment of the load control device is illustrated in FIG. 8. In both of these embodiments the load control device functions to regulate and maintain the total load of the electrical system below a predetermined value.

The use of electricity for heating homes and other buildings is gaining increasing favor because of the many advantages offered with respect to cleanliness and quietness of operation, low cost of maintenance and the like. Even more widespread use of electricity has been hindered by the somewhat higher cost of power than with other heating systems such as gas or oil. Therefore, systems or devices for decreasing the power costs are in great demand and it is to the solution of this problem that the present invention is devoted. The load control device of the present invention is of particular benefit to consumers in those areas where power is offered at a reduced rate for controlled heating, i.e., reduced rates are in effect whenever the load is maintained below a predetermined level similar to the night-time or off peak water heating rates offered by many power companies.

Considering now the first embodiment of the invention illustrated in FIGS. 1 through 7, the load control device is there identified generally by reference numeral 10. The load control device 10, as shown, is used to regulate or control the total load of an electrical system 11 which is energized from an electrical supply identified generally by reference numeral 12. The electrical supply 12 is shown as being a conventional single-phase, three-wire system including power conductors 14 and 16 and a ground conductor 18, the voltage between the power conductors 14 and 16 being 220 volts and the voltage between each of the power conductors 14 and 16 and the ground conductor, being 110 volts, as is well known. Although the load control device 10 has many applications, it is illustrated and described, for convenience, as used in an electrical system 11 for supplying 220 volt and/or 110 volt power to conventional household loads 20, which loads may include, for example, stoves, ovens, washing machines, dryers, lighting fixtures, and the like. The 220 volt loads are, of course, supplied with power from conductors 14 and 16 while the 110 volt loads are preferably distributed substantially equally between wire 14 and the ground conductor 18 and wire 16 and ground conductor 18. The system is also illustrated as normally supplying 220 volt power to electric heating loads 21 which may include space heaters and/or a central heating system for a home or building. The electrical loads 21 are illustrated as being of two types 21a and 21b, both of which are normally energized by 220 volts supplied from conductors 14 and 16 through a split bus arrangement described more fully below.

Briefly, the load control device 10 is operative to reduce the magnitude of voltage supplied to the electrical heating loads 21, whenever the total household load 20 reaches a predetermined value. This is accomplished by automatically reducing the voltage applied across the electrical heating loads from 220 volts to 110 volts whenever the power consumed by the household loads 20 exceeds the predetermined value. It should be understood that since the household loads comprise stoves, ovens, kitchen and the like appliances, and electrical lighting apparatus, which are intermittently used throughout the day, the total load of the household circuit at any particular time is simply the sum of the individual loads of the different electrical appliances or devices in use. Because it is not customary to use all of the household load simultaneously, the total load of the household circuit is generally somewhat less than the maximum possible household load. However, occasionally a great many of the household loads are operated thereby to cause the household circuit to draw more electrical energy from the electrical supply 12 than is desired.

In electrical installations, like the system 11, where both electrical heating loads and electrical household loads are employed, it is necessary to maintain the total load for the household and heating circuits below a predetermined value in order to take advantage of the lower rates available in many areas. Thus, the load control device 10 is operative to maintain the total load of the installation below the predetermined value by reducing the power requirements of the heating circuit whenever the power drawn by the household circuit exceeds a particular level. It will be appreciated that during the daylight hours when the greatest use of household apparatus is made, heating requirements are at a minimum so that the voltage to the heating load 21 can be reduced without inconvenience to the occupant of the building whereas if the voltage supplied to the household electrical appliance were reduced, the appliance might not function properly. In accordance with the present invention, the voltage applied across the heating loads 21 is reduced when necessary to keep the total load below the predetermined level and, at the same time, the voltage or voltages applied to the household loads 20 are maintained.

Figures 1, 2:
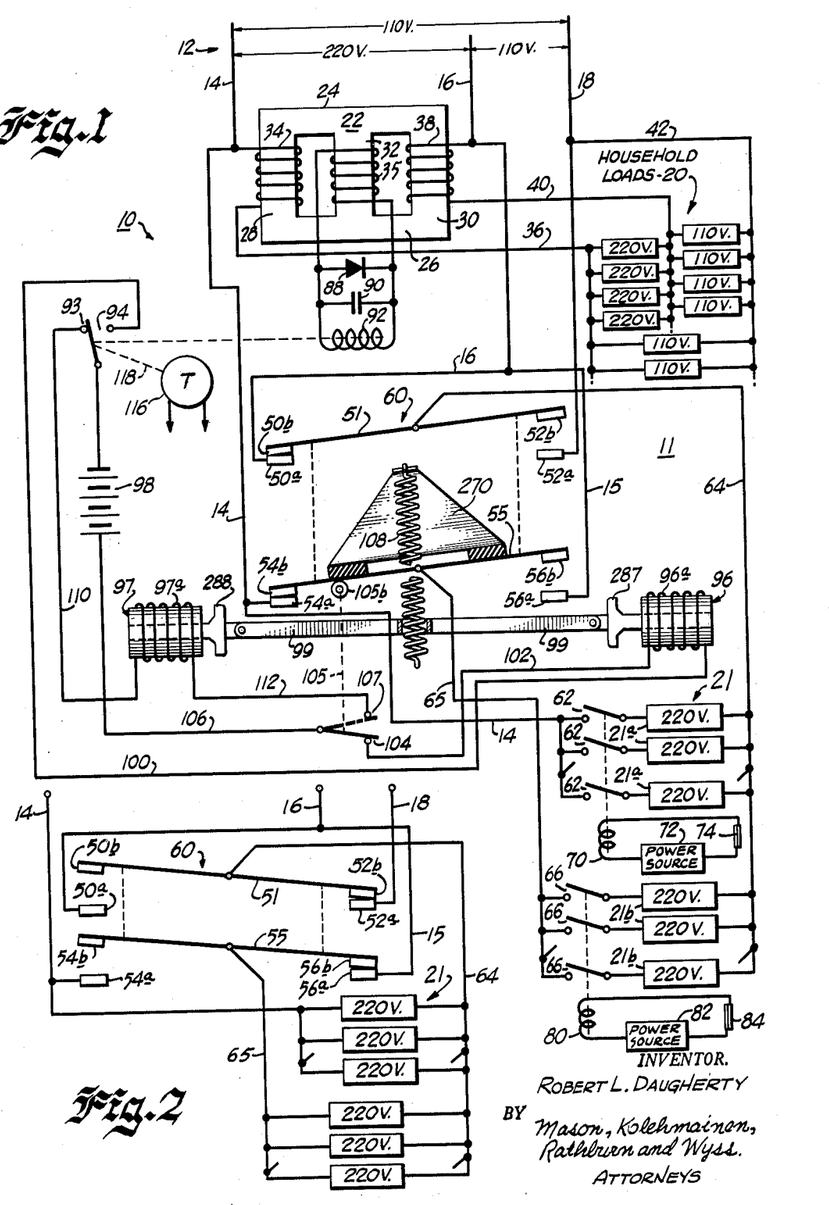
FIG. 1 is a schematic view of a load control device which is characterized by the features of the present invention and which includes a transfer switch shown in its inoperative condition.
FIG. 2 is a fragmentary schematic view, similar to FIG. 1, but shows the transfer switch in its operative condition.

Considering now the embodiment of the invention shown in FIG. 1 in detail, the power conductors 14 and 16 of the electrical supply system 12 are electrically connected to the household loads 20 through a current transformer 22 while the ground conductor 18 is electrically connected directly to selected ones of the loads 20. Accordingly, as shown, the loads 20 connected between the power conductors 14 and 16 are energized with 220 volts while the loads connected between the ground conductor 18 and either of the power conductors 14 or 16 are energized with 110 volts. However, irrespective of the connection of the household loads to the supply 12, the current flow through the power conductors 14 and 16 provides an accurate indication of the electrical energy supplied to all of the household loads. The current transformer 22, which is energized by the current flow through the two power conductors 14 and 16, is of conventional construction and includes a core formed by upper and lower legs 24 and 26 interconnected, respectively, by outer legs 28 and 30 and an intermediate or center leg 32. It further includes primary windings 34 and 38 respectively wound about the outer legs 28 and 30 and a secondary winding 35 wound upon the center leg 32. As shown, the power conductor 14 is electrically connected to one end of the primary widing 34 which is electrically connected at its other end to the household load 20 by a conductor 36. In similar manner, the power conductor 16 is electrically connected to one end of the primary winding 38 which has its other end electrically connected to the household loads 20 through a conductor 40. The ground conductor 18 of the electrical system 12 is electrically connected to the household loads 20 by a branch line 42. Accordingly, at all times the household loads 20 are supplied with electrical energy from the supply 12 even though the total load of the household circuit may exceed the above-mentioned predetermined value. Moreover, the magnitude of the voltage or voltages applied to the loads 20 does not change assuming, of course, that the voltage from the supply remains constant.

Assuming that the total load of the household circuit is below the predetermined value, the heating loads 21 are electrically connected through a transfer switch 60 to the supply 12 so that these loads are energized by the 220 volts existing between conductors 14 and 16. More specifically, the power conductor 14 is connected to a stationary contact 54a of the transfer switch 60 and to a set of contacts 62 which, when closed, connect the power conductor 14 to a first side of the heating loads 21a. When the switch 60 is in the deenergized condition shown in FIG. 1, the stationary contact 54a is in electrical engagement with a movable contact 54b carried upon an electrically conductive bridge 55 which forms part of the rocker assembly of the transfer switch 60, as described hereinafter. The bridge 55 is electrically connected through a conductor 65 to a set of contacts 66 which, when closed, electrically connect the conductor 65 to a first side of the heating loads 21b. With the switch 60 in deenergized condition, the power conductor 16, which is electrically connected to a stationary contact 50a, is electrically connected through a contact 50b carried upon an electrically conductive bridge 51 on the rocker assembly and through a conductor 64 to a second side of both of the heating loads 21a and the heating loads 21b.

It will, therefore, be appreciated that the heating loads 21a and 21b are both electrically connected through the transfer switch 60 across the power lines 14 and 16 so that 220 volts are supplied to the resistive heating loads 21a and 21b in order to energize these loads whenever thermostats 74 and 84 call for heat. The thermostats 74 and 84 are located in separate electrical circuits, including power sources 72 and 82 and relays 70 and 80 which respectively control the contacts 62 and 66 serially connected to heating loads 21a and 21b. Of course, the contacts 62 and 66 may be individually controlled by separate relays, similar to relays 70 and 80, which are energized by separate thermostats similar to the thermostats 74 and 84. In any event, the resistive heating elements 21a and 21b while energized under the control of the load control device 10 are primarily controlled by the thermostats 74 and 84 and, in fact, will be supplied with 220 volts only in response to a call for heat by the thermostats 74 and 84.

Assuming now that the number of household loads 20 in use is sufficient to draw more total power to the installation than is desired, i.e., the total load of both the household and heating loads exceeds a predetermined value, an excessive amount of current flows through the primary conductors 14 and 16 of the electrical supply system 12. This occurrence is referred to hereinafter as an overload condition of the household load circuit. In response to the flow of the excessive amount of current in the household load circuit, the current transformer 22 provides a signal for moving the transfer switch 60 from the position illustrated in FIG. 1 to the position illustrated in FIG. 2, whereby the electrical connections to the heating loads 21a and 21b are changed, i.e., the power conductor 14 and the ground conductor 18 are connected across the heating load 21a while the power conductor 16 and the ground conductor are connected across the heating loads 21b.

More specifically, when an overload condition exists in the household load circuit, the current flowing to the household loads 20 through conductors 36 and 40 and through the primary windings 34 and 38 of the current transformer 22 develops a control signal across the secondary winding 35. The primary windings 34 and 38 are so wound on the legs 28 and 30 that their generated fluxes respectively pass through the center leg 32 in the same direction, i.e., the flux linkages from the windings 34 and 38 are additive in the common center leg 32. As is well known, the amount of flux present in the center leg 32 is directly proportional to the amount of current flowing through the power conductors 36 and 40. Consequently, if the amount of current flowing to the household load circuit is small, the flux in the center leg 32 of the current transformer 22 is likewise small and, conversely, if the amount of current flowing to the household circuit is large, the flux in the center leg 32 is also large. Hence, whenever the current in the household circuit exceeds the predetermined overload value, the flux flow in the center leg 32 of the current transformer 22 also exceeds a predetermined level.

For the purpose of detecting the magnitude of the flux present in the center leg 32 of the current transformer 22 and particularly for determining when an overload flux exists in the center leg 32, the secondary winding 35 excites a detecting network comprising a rectifier 88 and a condenser 90 connected in parallel with each other. The rectifier 88 rectifies the A.C. signal induced in the secondary winding 35 in order to develop across the condenser 90 a D.C. voltage having a value directly proportional to the amount of flux in the center leg 32. The D.C. voltage developed across the condenser 90 is supplied to a D.C. sensitive relay 92 which is accurately set to be operated when this voltage reaches a predetermined level corresponding, of course, to the overload flux. Thus, an overload flux in the leg 32 causes the relay 92 to operate to break its contacts 93 and to close its contacts 94. The closing of the contacts 94 completes an energizing circuit for a solenoid 96 which is mechanically connected to the rocker assembly of the transfer switch through a reciprocable bar 99 and an overcenter spring arrangement 108. The energizing circuit for the solenoid 96 includes a power source 98 such as a battery, contacts 94, conductor 100, solenoid winding 96a, conductor 102, pair of contacts 104 of a position responsive switch 105 mechanically linked to the rocker assembly, and a conductor 106 connected to the power source 98. The solenoid 96 is effective, when energized, to move the transfer switch 60 from the position shown in FIG. 1 wherein the contacts 50a—50b, 54a—54b are closed, and contacts 52a—52b, 56a—56b are open to the position shown in FIG. 2 wherein the contacts 52a—52b, 56a—56b are closed and the contacts 50a—50b, 54a—54b are opened. As the snap-acting transfer switch 60 moves overcenter, the position responsive switch 105 is actuated by the rocker assembly to close its contacts 107 and to open its contacts 104, thereby to open the energizing circuit for the solenoid 96 and, hence, to deenergize the solenoid before the transfer switch 60 reaches the position shown in FIG. 2. The overcenter spring arrangement 108, described hereinbelow, completes the movement of the transfer switch 60 into the position shown in FIG. 2 independently of the solenoid 96.

With the transfer switch 60 in the position illustrated in FIG. 2, 110 volts are applied across the heating loads 21a and 21b. Specifically, the power conductor 14 continues to be electrically connected to the contacts 62 of the heating load 21a but the contacts 66 are now electrically connected to the power conductor 16 through a circuit including the conductor 65, the electrically conductive bridge 55, the contacts 56b—56a, a conductor 15 and the power conductor 16. Furthermore, the second sides of the heating loads 21a and 21b are no longer connected to the power conductor 16 but are instead connected to the ground conductor 18 through a circuit including the conductor 64, the electrically conductive bridge 51 and the closed contacts 52b—52a. Accordingly, the heating loads 21a are connected between the ground conductor 18 and the power conductor 14 while the loads 21b are connected between the ground conductor 18 and the power conductor 16 and, as a consequence, both of the loads 21a and 21b are supplied with 110 volt power. Since the voltage supplied to both loads is reduced from 220 volts to 110 volts, the heat supplied is reduced to about one-fourth of its former level but, more important, the current flowing through the heating loads 21a and 21b is reduced by one-half so that much less current is drawn from the supply circuit 12. With less current supplied to the heating loads 21, the total current supplied to both the heating load and household load circuits is maintained below a predetermined level, even though the current requirements of the household load circuit is higher. Thus, by the use of the above described device the user of the system 11 is able to maintain his power consumption below the predetermined level in order to take advantage of the lower power rates.

The load control device 10 remains operative at least as long as an overload amount of current is supplied to the household load circuit. It will be appreciated that when an overload condition ceases to exist in the household circuit, the current in the conductors 36 and 40 decreases with the result that the flux detected by the secondary winding 35 also decreases. As a result of the reduction in flux in the center leg 32 of the current transformer 22, the voltage appearing across the D.C. sensing relay 92 is reduced. However, because the relay 92 releases at a lower D.C. voltage than it picks up, the current in the household circuit, the flux in the center leg 32, and the D.C. voltage across the condenser must fall to approximately 80 percent of the overload current, flux and voltage, respectively, before the relay 92 is deenergized. This is advantageous since if the relay 92 is deenergized when the overload condition is reached, the load device 10 would be repeatedly rendered operative and inoperative as the current in the household circuit vacillated about the overload value. In any event, when the relay 92 is deenergized, the contacts 94 are opened and contacts 93 are closed, thereby opening the energizing circuit for the solenoid 96 at a second point and completing an energization circuit for a solenoid 97 through the power supply 98, contacts 93, conductor 110, solenoid winding 97a conductor 112, contacts 107, and the conductor 106. The solenoid 97, like the solenoid 96 is mechanically connected to the rocker assembly of the transfer switch 60 through the reciprocable bar 99 and the overcenter spring mechanism 108 and, hence, when this solenoid 97 is energized it is effective to move the transfer switch 60 from the position illustrated in FIG. 2 back to the original or deenergized position illustrated in FIG. 1. As the transfer switch 60 moves beyond its overcenter position, the switch 105 is actuated by the rocker assembly to close its contacts 104 and to open its contacts 107, thereby breaking the energization circuit for the solenoid 97. The overcenter spring arrangement 108 completes the movement of the transfer switch back to the position shown in FIG. 1 independently of the solenoid 97. In this position, the heating loads are once again energized with 220 volts under the control of the thermostats 74 and 84.

It will be apparent that both of the solenoids 96 and 97 are deenergized when the switch is in either of the positions illustrated in FIGS. 1 and 2 and are only momentarily energized to move the switch beyond its overcenter position. Accordingly, the solenoids 96 and 97 are in inactive condition at all times except when the load control device is initially rendered operative or inoperative.

Another important feature of the present invention resides in the split bus connection of the loads 21 to the power source in a manner which effects distribution of these loads supply under either the low voltage or high voltage condition. Thus, the conductor or bus 14 is connected to one side of the loads 21a in both conditions of the transfer switch 60 while the other side of these loads is connected to the conductor or bus 16 under the high voltage condition and to the ground conductor or bus 18 under the low voltage condition. The loads 21b, on the other hand, have one side connected to the bus 16 under both conditions of the transfer switch while the other side of these loads is connected to the bus 14 during the high voltage condition and to the ground conductor or bus 18 during the low voltage condition. Thus, the load is distributed or balanced between conductor 14 and ground conductor 18 and conductor 16 and ground conductor 18.

The load control device 10, in addition to its function of reducing the total load of the system 11 upon the occurrence of an ovrload in the household load circuit, may also be rendered effective to reduce the total load of the system during selected hours of the day as, for example, during the peak load periods. More specifically, it is known that peak power must be provided by the power companies during certain hours of the day and, thus, quite frequently these companies establish lower rates for off-peak power consumed. Thus, if possible, the consumer should minimize the power consumed during the peak or high rate periods of the day. To this end, a timer mechanism shown diagrammatically and identified by reference numeral 116 is continuously energized by suitable conductors (not shown) leading to the supply 12. The timer mechanism is of conventional construction and, in the interest of simplifying the present description, its detailed structure is neither illustrated nor described. The timer mechanism 116 comprises a suitable actuator (not shown) which is rendered operative during the selected hours of the day, the actuator controlling a suitable mechanical linkage 118 operably connected to the contacts 93 and 94. Thus, during the selected periods of the day, i.e., peak power periods, the timer mechanism 116 closes the contacts 94 whereby the transfer switch 60 moves from the position illustrated in FIG. 1 to the position illustrated in FIG. 2, as described above. As a result, 110 volts is supplied to the heating loads 21a and 21b and the total current supplied to the household and heating circuits is reduced, in the manner previously described. At the end of the peak power period, the timer mechanism 116 closes the contacts 93 and opens the contacts 94, with the result that the transfer switch 60 reverts from the position illustrated in FIG. 2 to that illustrated in FIG. 1, whereupon 220 volts are again supplied to the heating loads 21a and 21b.

Figure 3:
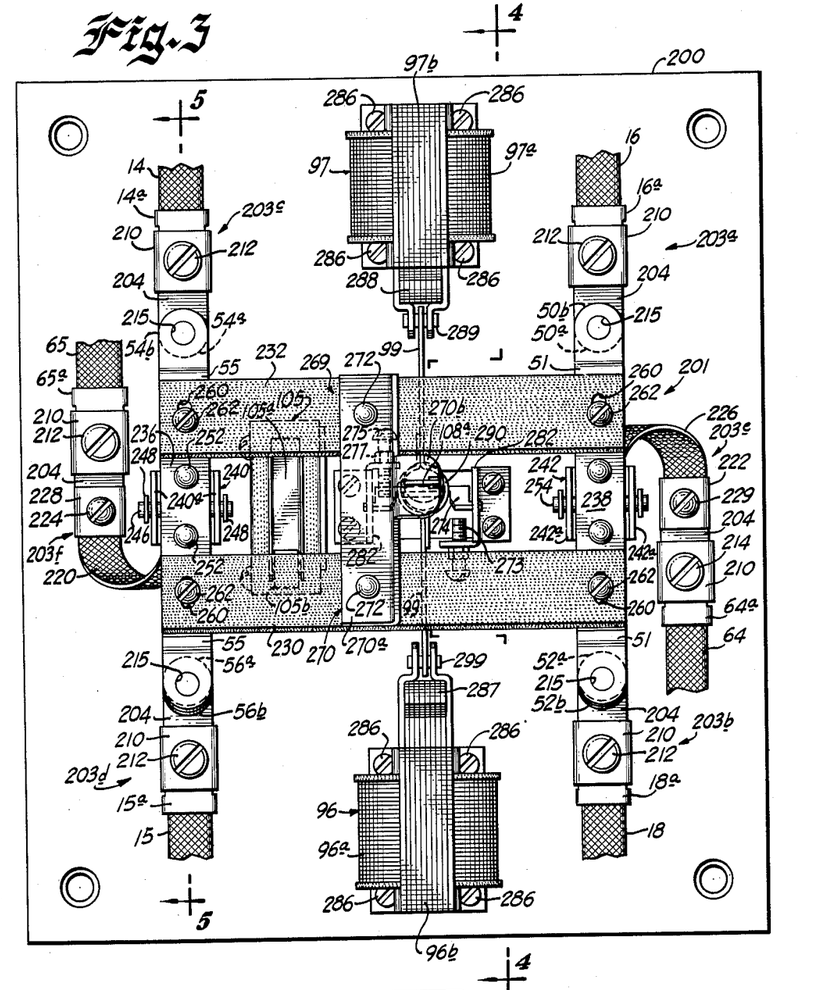
FIG. 3 is a top plan view of the transfer switch employed in the circuit shown in FIGS. 1 and 2.

Considering now the construction details of the transfer switch 60, attention is directed to FIGS. 3 through 7. As is there illustrated, the components of the transfer switch 60 are mounted upon a generally rectangular insulating platform or base 200. Briefly, the switch 60 comprises a control means, including the above-discussed solenoids 96, 97 and position responsive switch 105, and a rocker assembly 201 movable by the control means between the two operating positions respectively illustrated in FIGS. 1 and 2. The rocker assembly 201 is adapted to establish electrical connection between a plurality of fixed contacts as described above. Six stationary contacts are illustrated in FIG. 3 and these are designated by reference numerals 203a, 203b, 203c, 203d, 203e, and 203f. These contacts are similar in construction and each includes an electrically conductive plate 204 suitably secured to the platform 200 by a machine screw 208 (FIG. 5) or the like. Each of the electrically conductive plates 204 supports an electrical terminal or connector 210. In addition, the plates of the contacts 203a, 203b, 203c and 203d respectively support the stationary contacts 50a, 52a, 54a and 56a referred to above while the plates of contacts 203e and 203f respectively support clamps 222 and 228. The connectors 210 of the contacts 203a, 203b, 203c, 203d, 203e and 203f are respectively connected to the conductors 16, 18, 14, 15, 64 and 65. Each of these connectors comprises a hollow rectangular sleeve 209 for receiving one of the male terminals 14a, 15a, 16a, 18a, 64a and 65a of the conductors 14, 15, 16, 18, 64 and 65. The sleeve is secured to the plate 204 by a machine screw 206 having its head accommodated within a recess 200a in the base 200. A terminal screw 212 is threaded through a tapped opening in each sleeve in order to lock the terminals within the tubular connectors 210. To support the fixed contacts 50a, 52a, 54a and 56a in an elevated position upon the plate 204, each of the latter plates carries a cylindrical terminal support 214 having an axial bore 214a extending partially therethrough for receiving the screw 208 and having a central recess 214b in its upper end to accommodate a downwardly depending boss on its associated fixed contact. To provide a good electrical and mechanical connection between each of the stationary contacts 50a, 52a, 54a and 56a and its associated support 214, a soldered joint is preferably employed. It will be appreciated that, by the above construction, the conductors 14, 16, 15 and 18 are respectively connected to the stationary contacts 54a, 50a, 56a and 52a and, further, if desired, these conductors may be easily and quickly detached from the stationary contacts merely by loosening the screws 212.

As briefly described above, the transfer switch 60 includes a first electrically conductive bridge 51 carrying adjacent its opposed ends the movable contacts 54b and 56b and this switch further includes a second electrically conducting bridge 55 carrying near its opposed ends the contacts 50b and 52b. Considering the structure of the conductive bridges 51 and 55 in greater detail, the bridge 51 comprises a generally rectangular bar of electrically conductive material such as copper having adjacent each end an opening 215. Each of the contacts 50b, 52b, 54b and 56b includes a fixed boss, which is received within one of the openings 215 so that the contact faces of the pairs of contacts 50a—50b, 52a—52b, 54a—54b and 56a—56b oppose one another. Both a good electrical and mechanical connection is effected between the contacts 50b and 52b and the electrically conductive bridge arm by using a soldered joint to secure the contact bosses within the openings 215. The bridge 55 is identical in construction to the bridge 51 and, to this end, as is shown in FIG. 5, includes a pair of openings like the openings 215 described above and located respectively adjacent its ends for accommodating bosses on the contacts 54b and 56b, a soldered joint again being used to hold the bosses within these openings.

As is shown in FIG. 3, the bridge 55 is electrically connected to the contact 203f by a pigtail conductor 220 which has one of its ends secured to the plate 204 of the contact 203f by the clamp 228. A screw 224 is threaded through the clamp 228 and into a tapped opening in the plate 204 of the contact 203f for the purpose of applying clamping pressure to hold the end of the pigtail conductor 220. The conductor 220 is suitably connected at its other end to the under surface of the conductive bridge 55. The contact 203f connects the conductor 220 to a male terminal 65a on the conductor 65, which male terminal 65a is, of course, accommodated within the female connector 210 and is secured therein by the screw 214 of the contact 203f. By this construction, the conductor 65 is electrically connected to both of the movable contacts 54b and 56b through the conductive bridge 55, the pigtail conductor 220 and the plate 204, and female connector 210 of the contact 203f.

In a generally similar manner, the bridge 51 and, hence, its contacts 50b and 52b are electrically connected to the conductor 64. Specifically, a pigtail conductor 226 is secured at one end to the under surface of the bridge 51 and is secured at its other end to the plate 204 of the contact 203e by a clamp 222. Clamping pressure is supplied to the end of the conductor 226 by tightening a screw 229. The plate 204 of the contact 203e electrically connects the other end of the conductor 226 to the male terminal 64a of the conductor 64, which connector 64a is disposed within the female connector 210 and is locked therein by the screw 214.

Figures 4, 5, 6, 7:
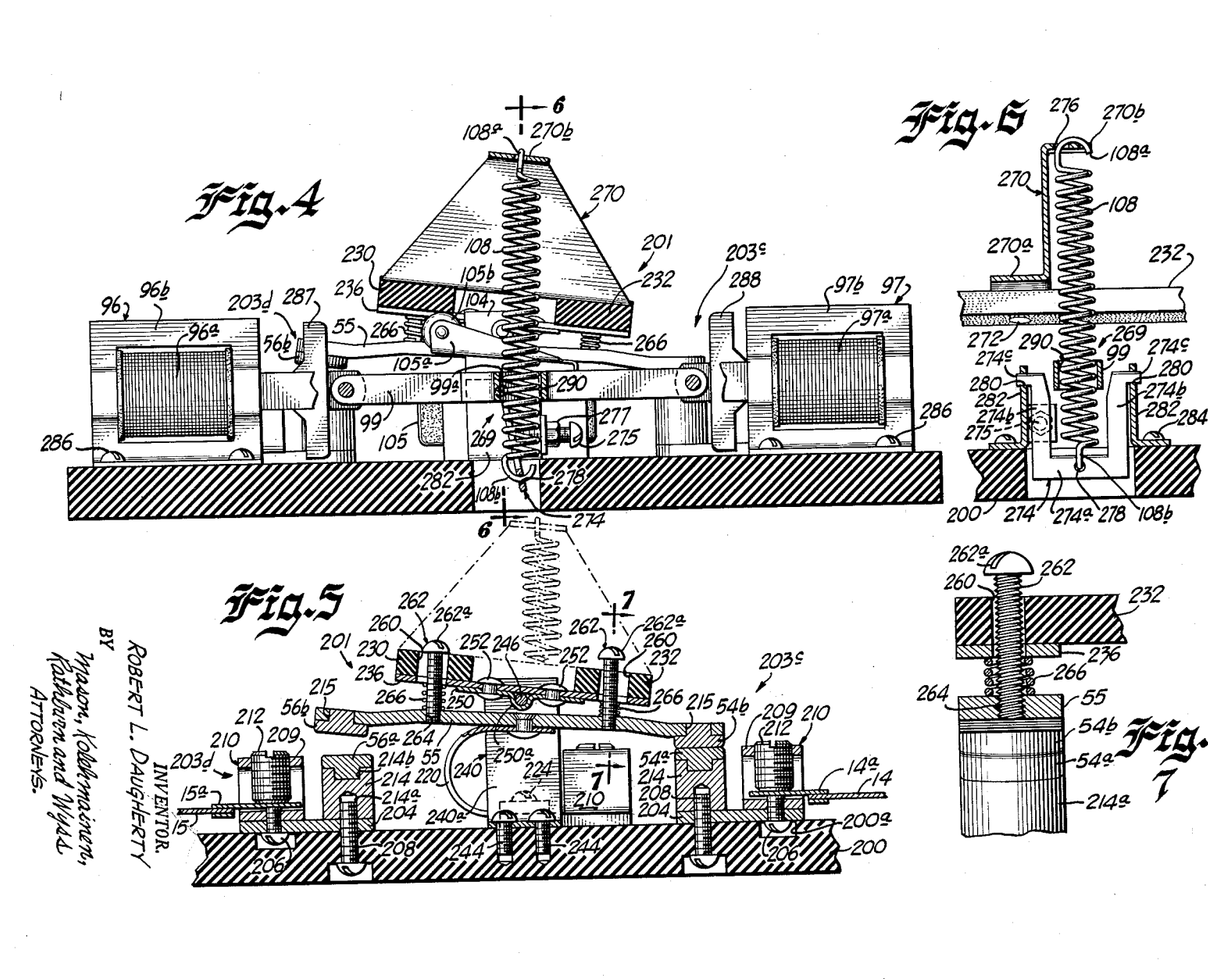
FIG. 4 is a sectional view taken along a line substantially corresponding to line 4—4 of FIG. 3 with certain parts being broken away to facilitate the illustration.
FIG. 5 is a fragmentary, sectional view taken along a line substantially corresponding to line 5—5 of FIG. 3.
FIG. 6 is a fragmentary sectional view taken along a line substantially corresponding to line 6—6 of FIG. 4.
FIG. 7 is an enlarged, fragmentary sectional view taken along a line substantially corresponding to line 7—7 of FIG. 5.

Considering now the rocker assembly 201 and referring particularly to FIGS. 3 and 5, this assembly comprises a pair of parallel extending, spaced apart insulating bars 230 and 232 respectively interconnected at their ends by a pair of conducting arms 236 and 238, the insulating bars 230, 232, and the arms 236, 238 comprising a generally rectangular frame 231. The frame 231 is pivotally supported from the base 200 for movement between the two operating positions referred to above under the control of the control means. As is best illustrated in FIG. 5, the arms 236 and 238 are supported for pivotal movement upon a pair of spaced apart U-shaped brackets 240 and 242 having their bight portions fixedly secured to the base 200. Since both of the arms 236 and 238 are identically supported from the brackets 240 and 242, only the bracket 240 will be described. Specifically, the bracket 240 is secured to the platform 200 by screws 244 and is provided with a pair of legs 240a extending upwardly from the bight portion. At the upper ends of the legs 240a suitable openings are provided for accommodating a pivot pin 246 which is maintained in assembled relation with the bracket 240 by a pair of lock rings 248 (FIG. 3) seated within annular grooves defined adjacent the opposed ends of the pin 246. The arm 236 is non-rotatably connected to the pivot pin 246 by a generally flat plate member 250 suitably secured to the under surface of the arms 236 by a pair of rivets 252, the plate 250 having a central deformed portion 250a for accommodating the pin 246. The arm 238 is non-rotatably supported upon a pivot pin 254 by a plate (not shown) similar to the plate 238. The pivot pin 254 is suitably supported between the upstanding legs 242a of the bracket 242. By this construction the frame 231 is supported for pivotal movement about its longitudinal axis with the arms 236 and 238, being rockable about their midpoints.

As indicated above, the rocker assembly 201 supports the electrically conductive bridges 51 and 55 and, in accordance with an important feature of the present invention, their contacts 50b—54b or 52b—56b are resiliently urged into engagement with their associated stationary contacts 50a—54a or 52a—56a. As is best shown in FIG. 3, a plurality of somewhat elongated openings 260 are defined near the four corners of the frame 231 and each of these openings is defined by aligned apertures in one of the insulating bars 230 or 232, and in one of the arms 236 and 238. Since the conductive bridges 51 and 55 are identically supported from the frame 231 of the rocker assembly 201, only the support for the bridge 55 will be described in detail. As is best shown in FIG. 3 the two openings 260 at the left side of the frame 231 accommodate a pair of elongated screws 262 having their shanks threaded into spaced apart, tapped openings 264 defined in the bridge 55, the screws 262 having enlarged heads 262a seating against the upper surface of the insulating bars 230 and 232. The conductive bridge 55 and the frame 231 are resiliently urged apart by a pair of coil springs 266 wound about the shanks of the screws 262, the ends of the springs 266 being seated, respectively, against the lower surface of the arm 236 and the upper surface of the bridge 55, as is clearly shown in FIG. 7. The conductive bridge 51 is supported in a similar manner from the opposite end of the frame 231 and also is resiliently urged away from the arm 238 by a pair of coil springs (not shown) wound around screws 262 threaded into the openings 260. Thus, the conductive bridges 51 and 55 are resiliently suspended beneath the arms 236 and 238 of the rocker assembly 201. As a consequence, the movable contacts of each pair 50b—54b or 52b—56b are independently and individually urged into engagement with their associated stationary contacts. More specifically, as is illustrated in FIG. 5, when the rocker assembly 201 is in the operating position wherein the contact 54b engages the contact 54a, the coil spring 266 is compressed thereby urging the contact 54b downwardly into firm engagement with the stationary contact 54a. Similarly, the contact 50b is urged into positive engagement with the stationary contact 50a by a spring (not shown) acting against the bridge 51. It should be understood that although positive engagement is simultaneously effected between both of the contact pairs 54a—54b and 50a—50b, the pressure applied between the contacts 54a and 54b is independent of that applied between the contacts 50a and 50b, since these pressures are developed by different ones of the coil springs 266. Therefore, variations in the construction of the rocker assembly and the conductive bridges due to manufacturing tolerances or uneven wearing between the pairs of contacts 54a—54b and 50a—50b do not adversely affect the operation.

The rocker assembly 201 includes an overcenter spring mechanism 269 which, in conjunction with the control means, causes the rocker frame 231 to be moved between its two operating positions, one of which is shown in FIGS. 4 and 5. As best shown in FIGS. 4 and 6, the overcenter spring mechanism 269 comprises a coil spring 108 having one end secured to a spring support 270 carried on the frame 231 and having its other end secured to a U-shaped bracket 274 pivotally supported upon the base 200.

More specifically, the support 270 is triangular in shape and includes a flat base flange 270a which is fixedly secured as by rivets 272 (FIG. 3) to the insulating bars 230 and 232. The support 270 is so located on the insulating bars 230 and 232 that a flat lip 270b formed near its upper end is located substantially equidistantly between the two ends and the two sides of the frame 231. As shown, the hooked upper end 108a of the spring 108 is inserted through an opening 276 in the bracket lip 270b, while the lower hooked end 108b of the spring 108 is inserted through an opening 278 defined in the center of the bight portion 274a of the U-shaped bracket 274. To provide a snap-acting overcenter operation, the arms 274b of the bracket 274 are provided with fingers 274c which extend into openings 280 defined in the upstanding legs of angulated support members 282 secured to the base 200 as, for example, by screws 284. The fingers 274c of the bracket 274 loosely fit in the openings 280 to permit the bracket 274 to pivot about a horizontal axis extending through the fingers. The lower end of the spring 108b is free to move relative to the fingers 274c and, as is well known, when the lower end of the spring 108b moves beyond its center position where it is vertically aligned with the spring fingers, the bracket 274 pivots about the supports 282. At this same time, of course, the upper end 108a of the spring 108 moves to the same side of the fingers 274c as the lower end 108b in a snap-acting manner under the force provided by the spring 108. Since the frame 231 and the suspended conductive bridges 51 and 55 are pivotally supported from the horizontal pins 246 and 254, the entire rocker assembly 201 follows the movement of the upper end 108a of the spring 108, with the result that the rocker assembly 201 moves from one of its operating positions to the other.

This movement of the spring 108 and, hence, the rocker assembly 201 is obtained by the control means including the pair of solenoids 96 and 97. These solenoids 96 and 97 are selectively energized in the manner indicated above to displace a bar 99 mechanically connected to the overcenter spring arrangement 269. Specifically, the solenoids 96 and 97, as is best shown in FIGS. 3 and 4, are mounted on the base 200 by a plurality of screws 286. Each of the solenoids 96 and 97 includes a laminated core 96b and 97b and an associated energizing winding 96a and 97a. The solenoids 96 and 97 respectively include armatures 287 and 288 each of which is connected to the rod 99 by a pivot connection 289 as illustrated in FIGS. 3 and 4. The armature 288 of the solenoid 97 is in its operative position while the armature 287 is in its inoperative or deenergized position. The switch 105 referred to above is suitably supported upon the base 200 and includes a switch operating arm 105a (see FIG. 4) carrying a roller 105b engaging the insulating bar 230 so that the solenoids 96 and 97 are deenergized as soon as the rocker assembly 201 moves over its center position in the manner described above.

The rocker assembly 201 is controlled by the solenoids 96 and 97 through the above-described overcenter spring arrangement 269 and, to this end, the rod 99 is mechanically coupled to the spring 108. Specifically, and as shown in FIGS. 3, 4, and 6, the center portion of the rod 99 is divided and bowed to provide a collar 99a encircling the body of the spring 108. Consequently, when either one of the solenoids 96 and 97 is energized to displace the rod 99, the collar construction 99a operates to move the body of the spring 108 either to the left or the right. Incident to this movement of the spring body, the lower end 108b of the spring pivots either to the left or the right until it moves beyond its center position described above. The upper end of the spring 108a is moved in the same direction under the force of the spring 108 with the result that the rocker assembly 201 moves from one of its operating positions to the other. At the same time that the rocker assembly is moving between its operating positions, the switch arm 105a is operated by the insulating bar 230 to open one of the above-described contacts 104 and 107, thereby to break the energizing circuit for the energized solenoid.

Assuming that the transfer switch 60 is in the position illustrated in FIGS. 3, 4, and 5, the heating loads 21 are electrically connected to the electrical supply system 12 so that 220 volts is supplied to the heating load circuit. In response to an overload condition in the household load circuit, the current transformer relay 92 becomes effective to close the contacts 94. The closing of the contacts 94 effects the energization of the solenoid 96 to move its associated armature 287 to the left as viewed in FIG. 4, with the result that the collar 99a moves the body of the spring 108 to the left. The movement of the spring 108 to the left moves the bight portion 274a of the bracket 274 to the left. As soon as the bight portion 274a moves beyond its center position, the spring 108 moves the rocker assembly 201 in a snap-acting manner into its second operating position, schematically shown in FIG. 2. The movement of the spring 108 and the bracket 274 to the left as viewed in FIG. 4 is limited by a stop 274 (FIG. 3) which may take the form of a screw secured to a flange on one of the support members 282. Immediately after the overcenter spring mechanism 269 takes control of the rocker assembly 201, the contact arm 105a of the switch 105 operates to open the contacts 104 and to close the contacts 107. The opening of the contacts 104 deenergizes the relay 96 so that its associated armature 287 no longer urges the rod 99 to the left. However, since the spring mechanism 108 is past its overcenter position, the rod 99 is moved to its extreme left position under the sole control of the spring 108. In this position, neither of the solenoids 96 or 97 is energized since the contacts 104 are opened in the energizing circuit for the solenoid 96 and the contacts 93 are opened in the energizing circuit for the solenoid 97.

When the overload condition in the household load circuit ceases to exist, the current transformer relay 92 operates to close the contacts 93, thereby energizing the solenoid 97. When the solenoid 97 is energized, its associated armature 288 moves to the right as viewed in FIG. 4 with the result that the rod 99 and its collar 99a also move to the right to pivot the lower end of the spring 108b and bracket 274 to the right. Thus, in a manner similar to the action described above, the overcenter spring mechanism 269 returns the rocker assembly 201 in a snap-acting manner, to the operating position, shown in FIGS. 3, 4 and 5, and the switch 105 causes the solenoid 97 to be deenergized. Movement of the spring 108 to the right is limited by engagement of the bracket 274 with a fixed stop 275 in the form of a screw threaded through a flange on the support member 282. The stop screw is locked in position by a nut 277.

Considering now the embodiment of the invention illustrated in FIG. 8, the load control device is schematically illustrated therein and is generally identified by reference numeral 300. The load control device 300 performs the same general function and operates in the same general manner as the above-described load control device 10, with the exception that instead of changing the magnitude of the voltage supplied to the heating loads when an overload condition occurs in the household circuit, selected ones of the heating loads are sequentially energized and deenergized during predetermined time intervals.

In normal operation, an electrical supply system 312, identical to the above-described supply system 12, supplies electrical energy to an electrical installation comprising a plurality of household loads 320 and a plurality of heating loads 321. The supply system 312 specifically comprises a power conductor 314, a power conductor 316, and a ground conductor 318 for providing either 220 volts or 110 volts in the manner previously described.

The power conductor 314 is connected to selected ones of the household loads 320 through a conductor 336 and through a primary winding 334 wound on an outer leg 328 of a current transformer 322, while the power conductor 316 is connected to selected ones of the household loads 320 through a conductor 340 and through a primary winding 338 wound about the outer leg 330 of the current transformer 322. The ground conductor 318 is likewise connected to selected ones of the household loads 320. In addition, the power conductor 314 is also connected to one of the sides of the heating loads 321 through a conductor 301 while the power conductor 316 is connected by a conductor 302 to the other sides of the heating loads 321 through pairs of contacts, collectively referred to as 303. The contacts 303 are controlled by a plurality of relays 304, which are respectively controlled in the manner previously indicated by a plurality of thermostats 305. The thermostats 305 are serially connected through a control governor 306 to a voltage source 307 which is, in turn, connected to the common sides of the relays 304. Thus, one of the thermostats 305 operates when its measured temperature falls below a predetermined level thereby closing the energizing circuit for its associated relay 304 whereupon the contacts 303 of this relay are closed to supply 220 volts to one of the heating loads 321.

In order to detect an overload condition in the household load circuit, the household circuit conductors 336 and 340, as described above, are connected through the current transformer 322 which is identical in construction to the previously described current transformer 22. A secondary winding 386 is wound about the center leg 332 of the core of this transformer. The voltage induced in the secondary winding 386 is supplied to a parallel circuit comprising a rectifier 388, a capacitor 390 and a D.C. sensitive relay 392, this parallel circuit being structurally and functionally identical to the corresponding circuit previously described. Accordingly, in response to an overload condition in the household load circuit, the relay 392 is energized and it remains energized as long as the overload condition persists.

However, in contrast to the previously described FIG. 1 embodiment, the energization of the relay 392 does not effect the operation of a transfer switch but, instead, effects the operation of the control governor 306 comprising those components located within the dotted lines. Another difference in the FIG. 8 embodiment resides in the fact that the overload control device 300 and specifically the control governor 306 is rendered operative for a predetermined time following the overload even though the overload condition may have been remedied during this predetermined time. In further contrast to the FIG. 1 embodiment and as indicated above, selected ones of the heating loads 321 are sequentially rendered operative for selective periods during the predetermined time, thereby reducing the current drawn by the heating load circuit and, thus, reducing the current demands on the power supply system 312.

In response to an overload condition in the household load circuit, the relay 392 is operated in the manner indicated above to close a pair of contacts 394. The closure of the contacts 394 completes an energizing circuit for an electric timer motor 400 from the power source 307, through a conductor 402, through a common relay conductor 404, through the closed contacts 394, through a conductor 406, through a pair of closed contacts 418a controlled by a timer cam 418, through a conductor 408, through the timer motor 400, and through a conductor 409 which is electrically connected to the power source 307. The energization of the timer motor 400 drives its associated timer cams 410, 412, 414, and 416 in order to respectively control associated contacts 410a, 412a, 414a and 416a which are serially connected with the thermostatic control relays 304. The motor 400 also drives the timer cam 418 that controls contacts 418a and 418b located in the energizing circuit for the timer motor 400. It will thus be appreciated that selected ones of the heating loads 321 are sequentially rendered operative and inoperative during the timing cycle of the timer motor 400. The cams 410, 412, 414 and 416 are so oriented on their driving shaft and are so shaped that they are effective to close their associated contacts in sequence and for approximately equal time intervals. Thus, since four cams are illustrated, during the first quarter of the timing cycle, one-fourth of the heating loads 321 (those controlled by contacts 410a) are energized while the remaining three-fourths are inoperative. During the second portion of the timing cycle, a second one-fourth of the heating loads (those controlled by contacts 412a) are energized while the balance of the heating loads are inoperative, and so on.

Figure 9:
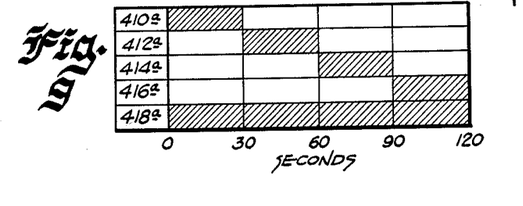
FIG. 9 is a chart depicting the timing cycle of a timer apparatus used in the embodiment of the invention shown in FIG. 8.

Returning now to the operation of the timer motor 400, when the control governor 306 is operative, the timer motor contacts assume the positions indicated in solid lines in FIG. 8. As shown, the timer motor cams 410, 412, 414 and 416 are so related that the contacts 410a, 412a, 414a and 416a are closed while the motor cam 418 is so related that the contacts 418a are closed and the contacts 418b are opened. However, when the relay 392 operates to complete the above-described energizing circuit for the timer motor 400, the timer motor cams 410, 412, 414, 416 and 418 are driven to cause the contacts 412a, 414a, 416a and 418a to open and the contacts 418b to close, the contacts 410a remaining closed under the control of the cam 410 as will be observed from the timing chart shown in FIG. 9. The closing of the contacts 418b completes a holding circuit for the timer motor 400 from the power source 307, through the conductor 402, through a conductor 420, through the closed contacts 418b, through the conductor 408, through the timer motor 400 and through the conductor 409 connected to the power source 307. Hence, the timer motor 400 is energized through its own contacts 418b entirely independently of the relay contacts 394 and, hence, entirely independently of the current transformer 322 which is responsive to the overload condition in the household load circuit. Accordingly, even though the overload condition in the household load circuit is remedied immediately after the timer motor 400 commences its operation, the control governor 306 continues to control the sequential operation of the heating loads 321 for the duration of the timer cycle of the timer motor 400.

The opening of the pairs of contacts 412a, 414a, and 416a at the start of the timing cycle renders the heating loads 321d through 321k inoperative during the first portion of the timing cycle since the energizing circuit for their associated control relays 304 are opened. The contacts 410a, which remain closed during the first portion of the cycle, condition the heating loads 321a, 321b and 321c for operation under the control of the thermostats 305a, 305b and 305c respectively. More particularly, in response to a call for heat by all of the thermostats 305a, 305b and 305c, electrical energizing circuits are completed for the associated relays 304a, 304b, and 304c from the power source 307, through the common conductor 422, through a conductor 424, through the contacts 410a, through a common conductor 426, through the individual thermostats 305a, 305b and 305c, through the individual relays 304a, 304b, 304c, through the common conductor 404, through the conductor 407, and through the conductor 402 which is connected to the power source 307. The energized relays 304a, 304b and 304c close their contacts 303a, 303b, and 303c, thereby supplying the heating loads 321a, 321b and 321c respectively with 220 volts from the supply system 312, as previously described above. Since the heating loads 321a, 321b and 321c are rendered operative under the control of the thermostats 305a, 305b and 305c, it is possible during the first portion of the timing cycle that one or more of the thermostats 305a, 305b and 305c will not call for heat.

At the end of the first portion of the timing cycle, for example, after a thirty-second time interval, the timer motor cam 410 operates to open the contacts 410a and the timer motor cam 412 simultaneously operates to close the contacts 412a. Accordingly, the heating loads 321a, 321b and 321c are rendered inoperative under the control of the timer cam 410 for the balance of the timing cycle and the heating loads 321d, 321e and 321f are conditioned by the timer cam 412 for operation under the control of their associated thermostats 305d, 305e and 305f for the second portion of the timer cycle. Of course, the heating loads 321g through 321k remain inoperative under the control of the timer cams 414 and 416 for the second portion of the timing cycle. The operation then continues in an obvious manner for the third and fourth portions of the cycle. These portions need not be equal although this is the preferred operation.

At the end of the timing cycle, for example, after a total lapse of two minutes, the timer cam 418 operates to close the contact 418a and to open the contacts 418b. The opening of the contacts 418b breaks the holding circuit for the timer motor 400 while the closing of the contacts 418a conditions the timer motor energizing circuit so that it will be completed by the contacts 394 in response to the next overload in the household circuit. Accordingly, the operation of the control governor 306 is again controlled by the current transformer 322. Assuming that the overload condition in the household load circuit has been remedied sometime during the timer cycle, it will be observed that at the end of this cycle the contacts 394 are opened, the timer motor 400 is deenergized and the control governor 306 is inoperative. Thus, at the end of the timing cycle, heating loads 321a through 321k are returned to the exclusive control of their associated thermostats 305a through 305k. Accordingly, if all of the thermostats 305 call for heat, all of the heating loads 321a through 321k are simultaneously supplied with 220 volts from the supply system 312. The heating loads 321a and 321k all remain operative under the control of their respective thermostats 305 until an overload condition again occurs in the household load circuit and the control governor is again rendered operative.

In the event that the overload condition continues to exist in the household load circuit at the end of the timer cycle, the above described energizing circuit for the timer motor 400 is completed when the contacts 418a are closed by the cam 418. Thus, the motor 400 remains energized and the cam 418 operates to simultaneously open the contacts 418a and close the contacts 418b to complete the above-described holding circuit for the motor 400. Accordingly, the control governor 306 is rendered operative again to sequentially render operative the heating loads and the above described operation is therefore repeated for another complete cycle. The cyclic operation of the control governor 306 is thus successively repeated as long as the overload condition exists in the household load circuit.

In certain domestic or commercial installations, it is usually necessary to continually supply heat for a particular purpose even though an overload condition exists within the household circuits. To this end, a heating load, for example, the heating load 321m, is operated entirely independently of the control governor 306. More specifically, the control relay 304m is not energized through the control governor 306 but is energized exclusively through its associated thermostat 305m by a circuit including the power source 307, the common conductor 422, a conductor 442, the thermostat 305m, the control relay 304m, the common conductor 404, and the conductor 402 connected to the power source 307. Of course, if continued heating or the like is not required in the installation, the thermostat 305m can alternatively be connected to the common conductor 440 instead of to the conductor 442, thereby permitting this thermostat to be controlled by the control governor 306.

As previously discussed in connection with the FIG. 1 embodiment of the present invention, the load control device 300 may be provided with a timer mechanism 450 for assuring that the total installation load will be maintained below a predetermined value during periods of peak power demands each day. Thus, by using the control governor to limit the heating load during these peak power periods each day, advantage may be taken of the lower power rates. Specifically, the timer mechanism 450 includes a timer motor (not shown) suitably energized by the supply system 312 and further includes a pair of contacts 451 controlled by a suitable cam (not shown) driven by the timer motor (not shown). The contacts 451 are electrically shunted across the conductors 404 and 406 by a pair of conductors 452 and 454. It will be appreciated that the contacts 451 are also connected in parallel with contacts 394 of the current transformer relay 392 and, thus, they control the operation of the control governor. Hence, during the selected hours of the day, the contacts 451 are closed, thereby to close the energizing circuit for the timer motor 400 including the power source 307, the conductor 409, the timer motor 400, the conductor 408, the contacts 418a, the conductor 406, conductor 452, the timer mechanism contacts 451, the conductor 454, the conductor 404, and the conductor 402 connected to the power source 307. The operation of the timer motor 400 is identical to that described above and will be obvious. The contacts 451 remain closed during the peak power periods and, accordingly, the energizing and holding circuits function continuously to energize the timer motor 400 so that the cyclic operation of the control governor 306 is repeated.

From the foregoing description it will be appreciated that selected ones of the heating loads are rendered operative and inoperative in order to reduce the heating load power requirements of the installation 311, either by operation of the current transformer 322 in response to an overload condition or by operation of the timer mechanism 450 during the peak power periods.

While there has been described an illustrative embodiment of the invention, it will be understood that various modifications may be made therein which are within the true spirit and scope of the invention as defined in the appended claims.

What is claimed as new and desired to be secured by Letters Patent of the United States is:

1. In an electrical system for controlling the distribution of power between a plurality of electrical loads of different priority connected in first and second circuits, means connecting said circuits to a common power source, and means responsive to an overload condition in said first circuit for reducing the total effective load of the electrical loads in said second circuit as long as said overload condition exists thereby to reduce the effective peak load on the power source during the time that the overload condition exists.

2. In an electrical control apparatus for a plurality of electrical devices connected in first and second circuits, terminal means adapted to be connected to a voltage source, circuit means interconnecting said terminal means and said first and second circuits, and means responsive to an overload condition in said first circuit for sequentially disconnecting from said voltage source different ones of the electrical devices in said second circuit for predetermined periods of time so that less than all of the electrical devices are connected to said voltage source at any one time following the occurrence of the overload condition.

3. In an electrical control apparatus for a plurality of electrical devices connected in first and second circuits, terminal means adapted to be connected to a voltage source, circuit means interconnecting said terminal means and said first and second circuits, means responsive to an overload condition in said first circuit for sequentially disconnecting from said voltage source different ones of the electrical devices in said second circuit so that less than all of the electrical devices are connected to said voltage source at any time following the occurrence of an overload condition, and including a timer motor means associated with said disconnecting means and energized by the occurrence of said overload condition.

4. The apparatus of claim 3 wherein said timer motor means includes a plurality of cam means for individually controlling the electrical devices during the spaced predetermined periods of time.

5. In an electrical control apparatus for a plurality of electrical devices, terminal means adapted to be connected to a voltage source, circuit means interconnecting said terminal means and said electrical devices, means responsive to an overload condition, means controlled by said responsive means for sequentially disconnecting from and connecting to said voltage source selected ones of the electrical devices to obviate said overload condition, and control means independent of said disconnecting means and included in said circuit means for rendering certain ones of said electrical devices electrically inoperative during a predetermined period of each day.

6. In an electrical control apparatus for a plurality of electrical devices connected in first and second circuits, terminal means adapted to be connected to a voltage source, circuit means interconnecting said terminal means and said first and second circuits, means responsive to an overload condition in said first circuit for sequentially disconnecting selected ones of said electrical devices in said second circuit from said voltage source for predetermined periods of time, and control means in said second circuit operable independently of said disconnecting means for electrically disconnecting certain ones of said electrical devices in said second circuit from said voltage source during a predetermined period of each day.

7. In an electrical control apparatus for a plurality of electrical devices connected in first and second load circuits of different priority, terminal means adapted to be connected to a voltage source, circuit means interconnecting said terminal means and said first and second circuit, and means responsive to an overload condition in a said circuit of first priority for reducing the magnitude of voltage to the electrical devices in said circuit of second priority thereby to reduce the peak load of the devices in both the first and second circuits at the terminal means.

8. In a system for controlling the delivery of power to a plurality of loads from a three-wire source including first and second conductors and a neutral conductor, the combination of means connecting the power source to the loads and including a switch selectively operable between a first position wherein high voltage from the source is applied across the loads and a second position wherein low voltage from the source is applied across the loads, said connecting means including a first circuit for connecting the first conductor of the source to one side of a first group of loads irrespective of the switch position and a second circuit for connecting the second conductor of the source to one side of a second group of loads irrespective of the switch position, said connecting means including circuit means for connecting the other side of the first group of loads to the second conductor when the switch is in said first position and for connecting said other side of the first group of loads to the neutral conductor when the switch is in its second position, and said connecting means further including circuit means for connecting the side of the second group of loads to which the second conductor is not connected to the first conductor when the switch is in its first position and for connecting the side of said second group of loads to which the second conductor is not connected to the neutral conductor when the switch is in said second position.

9. In a system for controlling the delivery of power to a plurality of loads from a three-wire source including first and second conductors and a neutral conductor, the combination of means connecting the power source to the loads, said connecting means including a switch operable in response to an overload on said source for movement from a first position wherein high voltage from the source is applied across the loads to a second position wherein low voltage from the source is applied across the loads, said connecting means including a split bus arrangement for connecting the voltage existing between the first and second conductors across said loads when the switch is in the first position and for connecting the voltage between the first conductor and the neutral conductor across one group of loads and the voltage between the second conductor and the neutral conductor across another group of loads when the switch is in the second position.

References Cited in the file of this patent

UNITED STATES PATENTS

| | | |
|---|---|---|
| 2,372,102 | Mahnke | Mar. 20, 1945 |
| 2,614,189 | Mosely | Oct. 14, 1952 |
| 2,769,924 | Beery | Nov. 6, 1956 |
| 2,874,310 | Young | Feb. 17, 1959 |
| 2,923,831 | Wallene | Feb. 2, 1960 |